(12) United States Patent
Duan et al.

(10) Patent No.: US 8,625,268 B2
(45) Date of Patent: *Jan. 7, 2014

(54) SLIDING MODULE FOR ELECTRONIC DEVICE

(75) Inventors: Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 170 days.

This patent is subject to a terminal disclaimer.

(21) Appl. No.: 13/220,182

(22) Filed: Aug. 29, 2011

(65) Prior Publication Data

US 2012/0293926 A1 Nov. 22, 2012

(30) Foreign Application Priority Data

May 16, 2011 (CN) .......................... 2011 1 0125271

(51) Int. Cl.
*G06F 1/16* (2006.01)
(52) U.S. Cl.
USPC ................. 361/679.27; 248/611; 312/334.46; 345/173

(58) Field of Classification Search
USPC ........... 248/121, 286.1, 157, 688, 278.1, 611; 361/679.59, 679.34, 679.06, 679.54, 361/679.01, 679.28, 679.17, 679.55, 361/679.41, 679.27, 679.23, 679.58, 361/679.15, 679.22; 345/158, 420, 655, 345/589, 156, 168, 169, 1.1, 173, 174; 439/66, 67, 354; 312/334.1, 323, 312/293.1, 237, 319.2, 223.1, 223.2, 334.46
See application file for complete search history.

(56) References Cited

U.S. PATENT DOCUMENTS 7,613,485 B2 * 11/2009 Chen et al. ................. 455/575.4
2012/0170186 A1 * 7/2012 Wu et al. .................. 361/679.01

* cited by examiner

*Primary Examiner* — Hung Duong
(74) *Attorney, Agent, or Firm* — Altis Law Group, Inc.

(57) ABSTRACT

A sliding module includes a first section, a second section, a pivot plate, a hinge module and an assist lever. Two sides of the pivot plate are respectively rotatably connected to the first section and the second section. The hinge module is positioned on the second section. Two ends of the assist lever are respectively rotatably connected to the first section and the hinge module. The first section brings the assist lever to rotate relative to the hinge module, and elevates the pivot plate, the pivot plate and the assist lever bring the first section to move and rotate relative to the second section in a tilted orientation.

15 Claims, 6 Drawing Sheets

SLIDING MODULE FOR ELECTRONIC DEVICE

BACKGROUND

1. Technical Field

The present disclosure generally relates to electronic devices, and particularly to a sliding module for an electronic device.

2. Description of Related Art

Portable electronic devices such as mobile phones, laptops, and personal digital assists (PDAs) are widely used. As such, the sales and use of slide-type portable electronic devices have been on the increase. A slide-type portable electronic device has two housings, which can open and close relative to each other with the use of a slide mechanism.

However, the slide-type devices typically only allow the two housings to slide parallel to each other. Therefore, when the slide-type is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
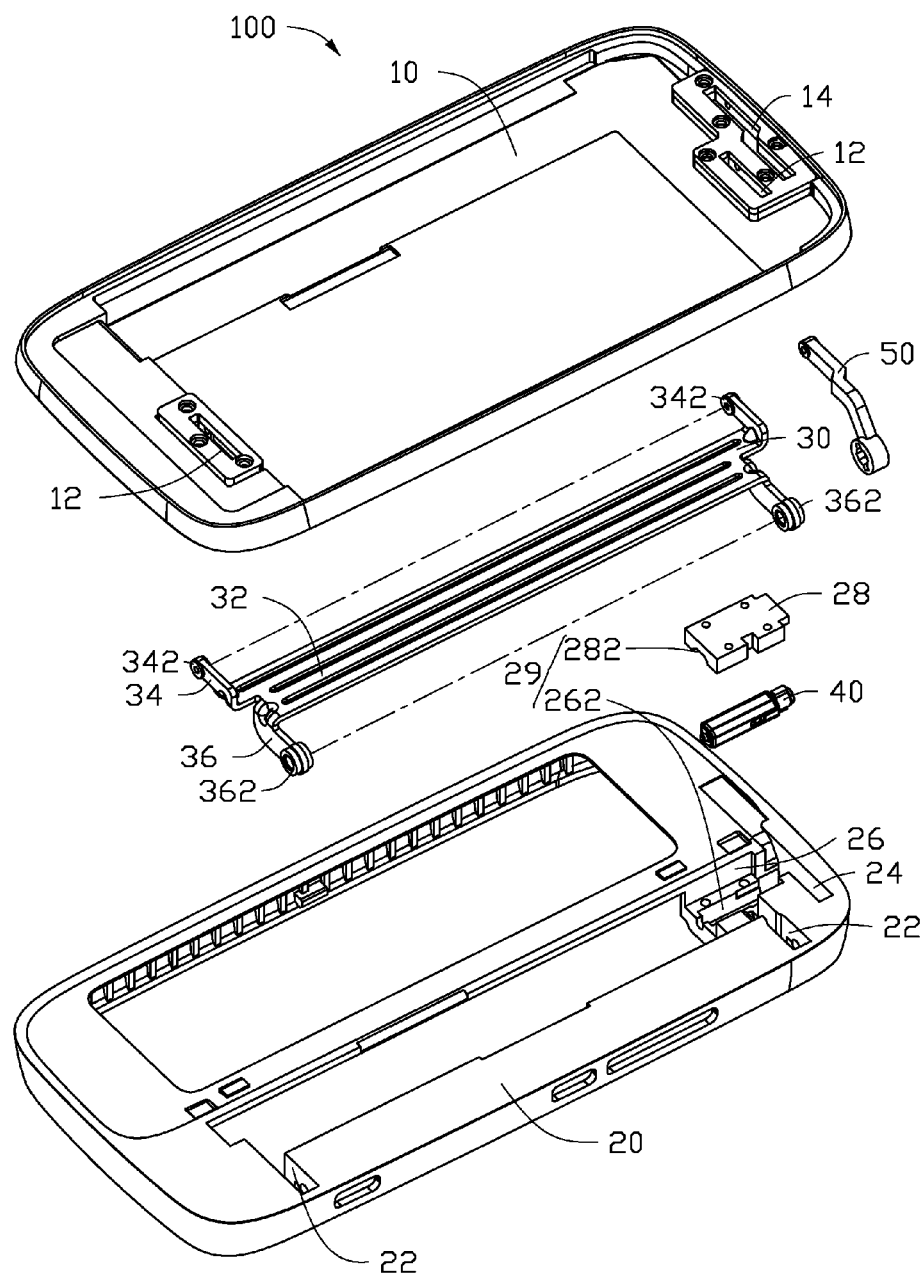
FIG. 1 is an exploded, isometric view of an electronic device according to an exemplary embodiment.
Figure 2:
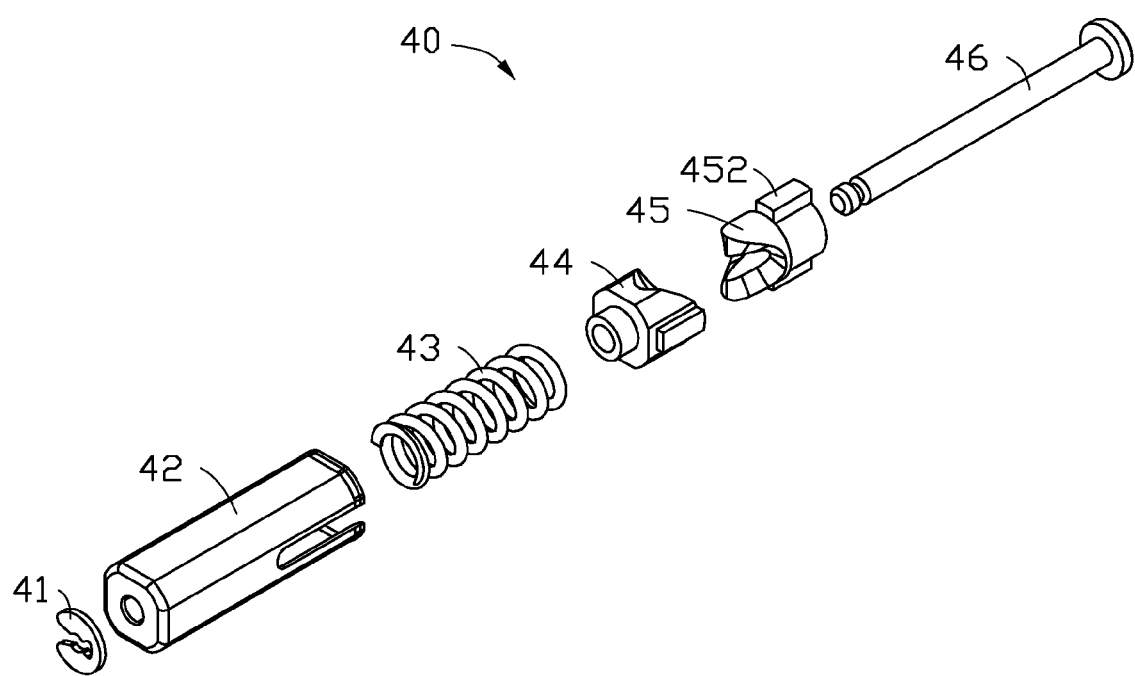
FIG. 2 is an exploded, isometric view of a hinge assembly used in the electronic device shown in FIG. 1.

FIG. 1 and FIG. 2 show an exemplary embodiment of a sliding module 100 applied in an electronic device, such as a mobile phone, or a personal digital assist. The sliding module 100 can be in a closed orientation and a tilted open orientation. The sliding module 100 includes a first section 10, a second section 20, a pivot plate 30, a hinge module 40, and an assist lever 50. In the closed orientation, the first section 10 and the second section 20 overlap each other. In the tilted open orientation, the first section 10 is tilted relative to the second section 20 for better viewing.

The first section 10 defines two retaining grooves 12 at opposite sides of a surface for connecting one side of the pivot plate 30. A receiving groove 14 is defined in the first section 10 adjacent to one of the retaining grooves 12 for connecting one end of the assist lever 50.

The second section 20 defines two notches 22 at opposite sides of a surface to connect the other side of the pivot plate 30. A slot 24 is defined in the surface of the second section 20 adjacent to one of the notches 22. The other end of the assist lever 50 is connected to the slot 24. A receiving portion 26 is formed on the second section 20 to communicate with the slot 24 and the adjacent notch 22. In this embodiment, a fixing cover 28 is mounted to the receiving portion 26, and the hinge module 40 is positioned between the fixing cover 28 and the receiving portion 26. In this exemplary embodiment, the fixing cover 28 is mounted to the receiving portion 26 with screws to conveniently assemble the hinge module 40. Alternatively, the fixing cover 28 is integrally formed with the receiving portion 26. In this exemplary embodiment, the receiving portion 26 defines a first arcuate groove 262, and the fixing cover 28 defines a second arcuate groove 282. The first arcuate groove 262 and the second arcuate groove 282 together define a hinge space 29 to non-rotatably connect the hinge module 40.

The pivot plate 30 includes a main body 32, and two pairs of first, second support arms 34, 36 formed at two sides of the main body 32. The pair of first support arms 34 is rotatably connected to the retaining grooves 12, and the pair of second support arms 36 is rotatably connected to the notches 22. In this exemplary embodiment, each first support arm 34 includes a first hinged end 342. The first hinged ends 342 are coaxially arranged to be connected to the first section 10. Each second support 36 includes a second hinged end 362. The second hinged ends 362 are coaxially arranged to be connected to the second section 20.

Figure 3:
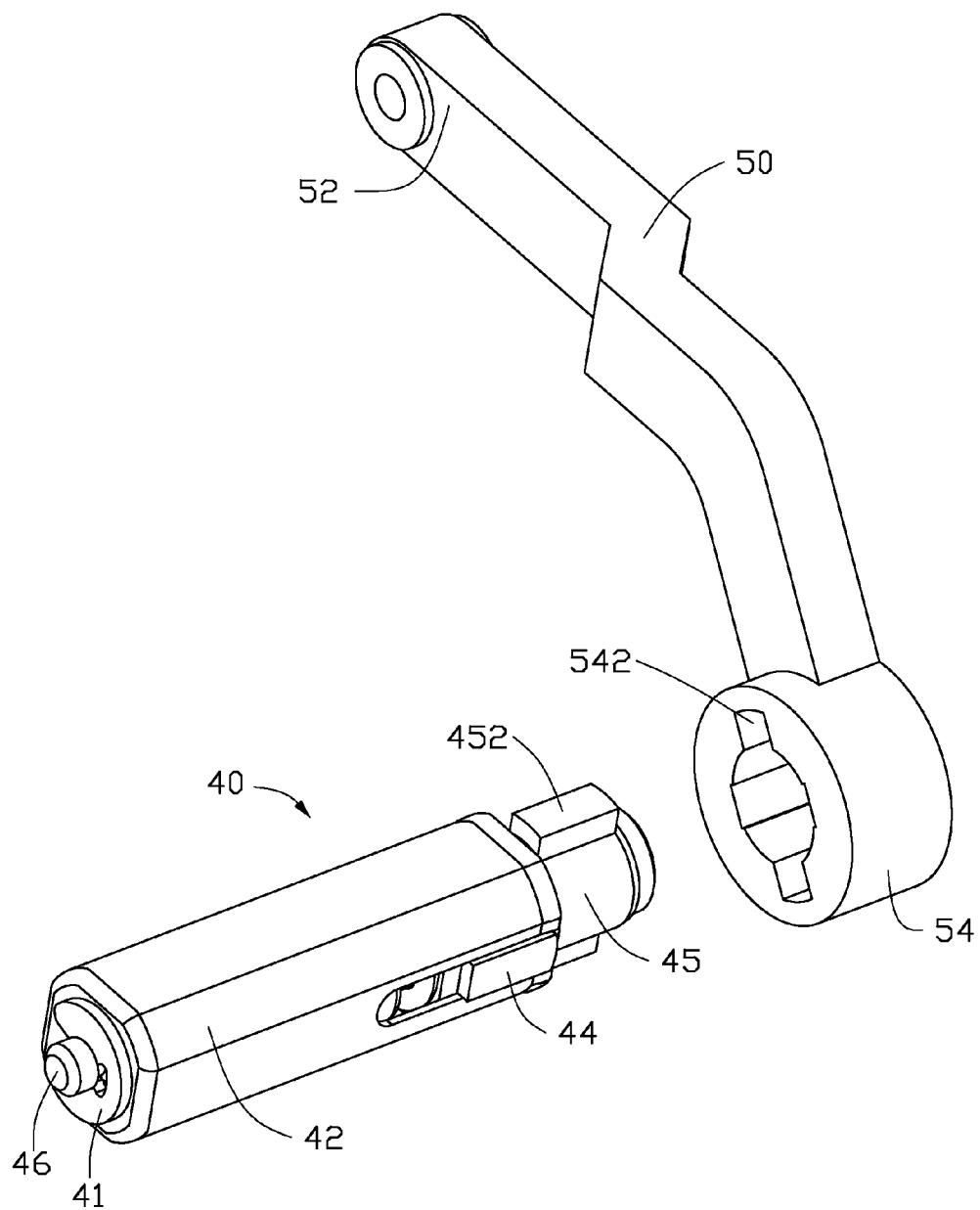
FIG. 3 is an enlarged, isometric view of the assembled hinge assembly and an assist lever shown in FIG. 1.

Referring to FIGS. 2 and 3, the hinge module 40 includes a washer 41, a sleeve 42, a resilient member 43, a follower 44, a cam 45, and a shaft 46. The cam 45, the follower 44, and the resilient member 43 are fitted over the shaft 46, and are received in the sleeve 42. The washer 41 is latched to one end of the shaft 46 with the above elements to assemble a unit. The follower 44 is non-rotatably engaged in the sleeve 42. The sleeve 42 can be inserted into the hinge space 29 and cannot rotate in the hinge space 29. In this exemplary embodiment, two opposite blocks 452 are formed on the cam 45 to non-rotatably engage with the assist lever 50. The follower 44 includes peaks and valleys, and the cam 45 can slide over the peaks of the follower 44 to allow the cam 45 to rotate relative to the follower 45.

The assist lever 50 includes a connecting end 52 and a driving end 54 integrally formed together. The connecting end 52 is received in the receiving groove 14, and is connected to the first section 10 with a post (not shown). The driving end 54 defines a limited groove 542 to receive the blocks 452 of the cam 45.

Figure 4:
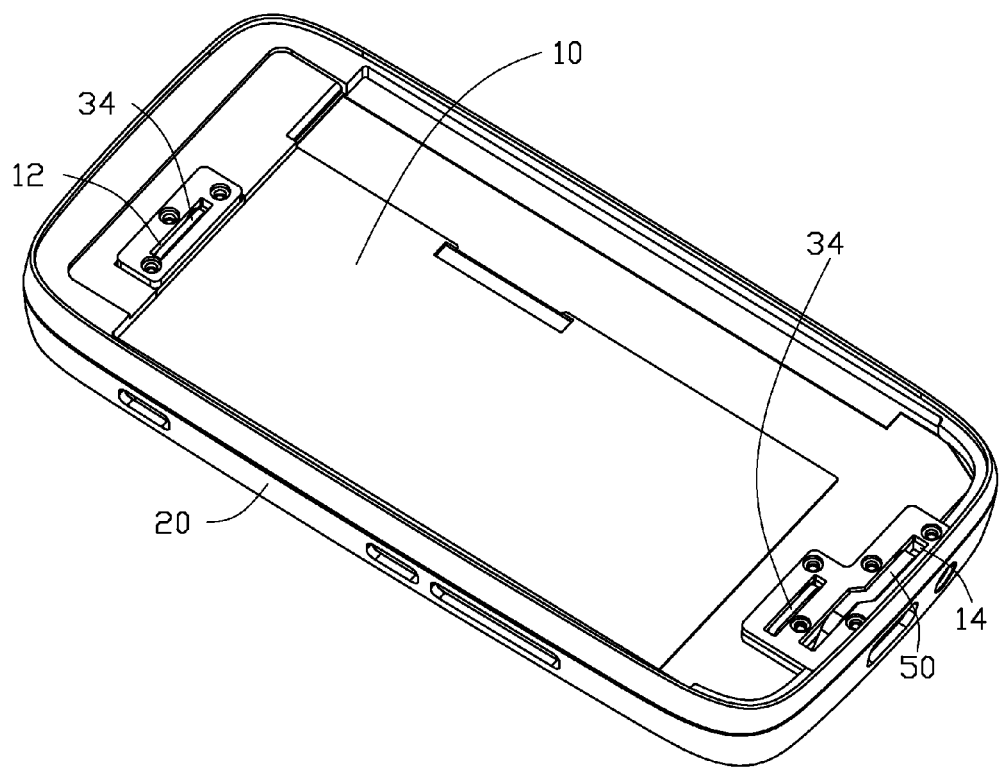
FIG. 4 is an isometric view of the electronic device of FIG. 1 in a closed orientation.

In assembly, referring to FIG. 4, the blocks 452 of the cam 45 is latched in the limited groove 542 to connect the assembled hinge module 40 to the assist lever 50. The hinge module 40 with the assist lever 50 is assembled to the second section 20. The hinge module 40 is received in the first arcuate groove 262, and the assist lever 50 is received in the slot 24. After that, the fixed cover 28 is mounted to the receiving portion 26 to non-rotatably engage the hinge module 40 in the hinge space 29. The first support arms 34 are rotatably connected to the retaining grooves 12, and the second support arms 36 are rotatably connected to the notches 22 for connecting the pivot plate 30 to the first section 10 and the second section 20. The connecting end 52 of the assist lever 50 is connected to the receiving groove 14. Accordingly, the sliding module 100 is assembled.

When the sliding module 100 is in a closed orientation, the first section 10 is parallel to and overlaps the second section 20. The first support arms 34 are received in the retaining grooves 12, and the second support arms 36 are received in the notches 22. The assist lever 50 is received in the receiving groove 14 and the slot 24.

Figure 5:
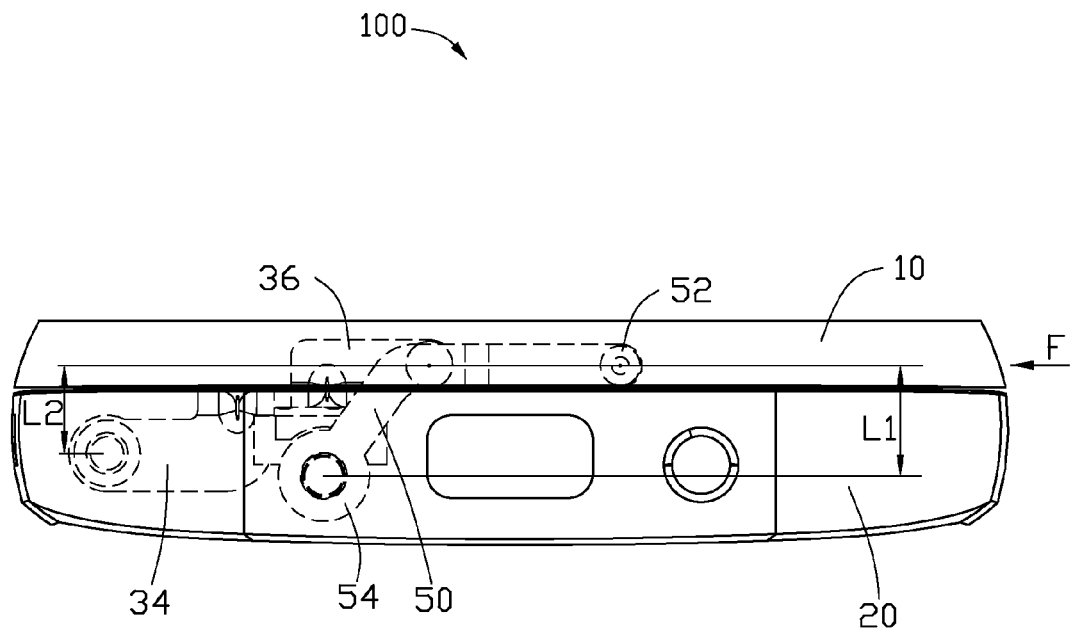
FIG. 5 is a side view of the electronic device of FIG. 4, showing the position relationship of a pivot plate and the assist lever.
Figure 6:
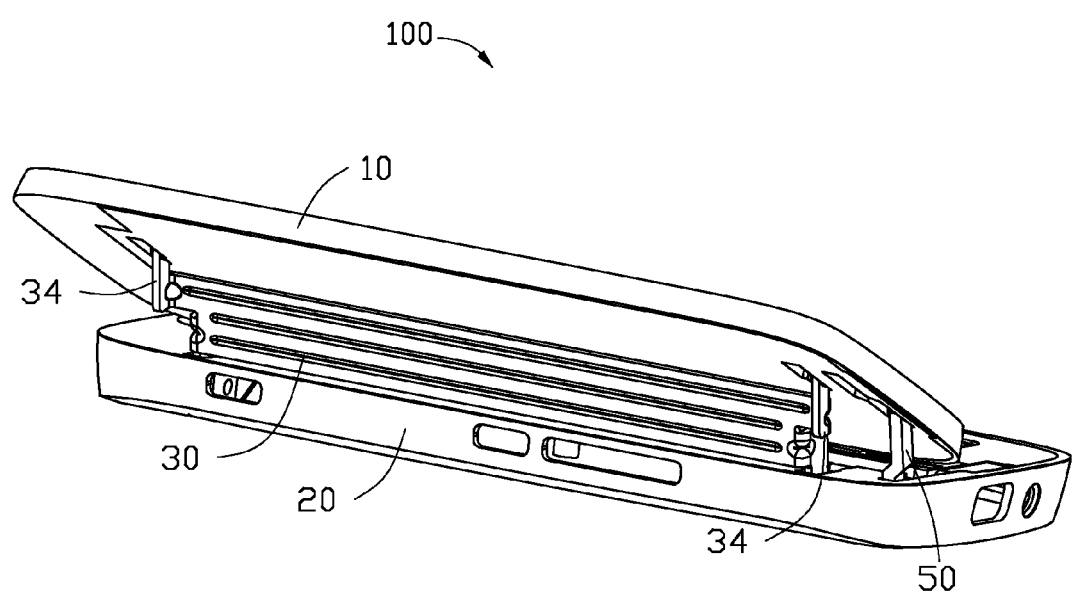
FIG. 6 is an isometric view of the electronic device of FIG. 4 in an open orientation.

Referring to FIGS. 5 and 6, when the sliding module 100 is to be opened, a user may apply a force F to the first section 10 to move the first section 10 away from the second section 20. The pivot plate 30 and the assist lever 50 are forced to rotate, and further elevate the first section 10. The cam 45 is driven by the assist lever 50 to rotate relative to the follower 44. When the cam 45 slides over the peaks of the follower 44, the cam 45 automatically rotates the assist lever 50 until the first section 10 is completely opened relative to the second section 20. The first section 10 is supported in a tilted position relative to the second section 20.

The sliding module 100 can be applied in a portable electronic device such as a mobile phone. The electronic device includes a cover and a housing engagable with the cover. The cover is secured to the first section 10, and the housing is secured to the second section 20. Thus, the portable electronic device opens or closes with use of the sliding module 100.

There are many advantages to having the hinge module 40 assembled to the assist lever 50. Referring to FIG. 5, a lever arm of a force of rotating the assist lever 50 is L1 when the hinge module 40 is assembled to the assist lever 50. A lever arm of a force of rotating the pivot plate 30 is L2 when the hinge module 40 is assembled to the pivot plate 30. Since L1 is longer than L2, when a predetermined moment of force is applied, the force of rotating the assist lever 50 is relative small. The operation is easier. In addition, if the hinge module 40 is assembled to the pivot plate 30, a coaxial degree of the second hinged ends 362 and the hinge module 40 is required. Since the hinge module 40 is made of a plurality of components, it is difficult to satisfy this coaxial degree requirement. However, when the hinge module 40 is assembled to the assist lever 50, the assembly process is relatively easy.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
a first section;
a second section;
a pivot plate, two sides of the pivot plate respectively rotatably connected to the first section and the second section;
a hinge module positioned on the second section;
an assist lever, two ends of the assist lever respectively rotatably connected to the first section and the hinge module;
wherein the first section brings the assist lever to rotate relative to the hinge module, and elevates the pivot plate, the pivot plate and the assist lever bring the first section to move and rotate relative to the second section in a tilted orientation.

2. The sliding module as claimed in claim 1, wherein the pivot plate includes a main body, and a pair of first support arms, a pair of second support arms formed at two sides of the main body, the first support arms are rotatably connected to first section, and the second support arms are rotatably connected to the second section.

3. The sliding module as claimed in claim 2, wherein each first support arm includes a first hinged end, the first hinged ends are coaxially arranged to be connected to the first section, each second support includes a second hinged end, and the second hinged ends are coaxially arranged to be connected to the second section.

4. The sliding module as claimed in claim 1, wherein a receiving portion is formed on the second section, a fixing cover is mounted to the receiving portion, and the hinge module is positioned between the fixing cover and the receiving portion.

5. The sliding module as claimed in claim 4, wherein the fixing cover is mounted to the receiving portion with screws.

6. The sliding module as claimed in claim 4, wherein the receiving portion defines a first arcuate groove, and the fixing cover defines a second arcuate groove, and the first arcuate groove and the second arcuate groove together define a hinge space to non-rotatably connect the hinge module.

7. The sliding module as claimed in claim 4, wherein the second section defines two notches at opposite side of a surface thereof for connecting the other side of the pivot plate, a slot is defined in the surface of the second section adjacent to one of the notches, the slot connects one end of the assist lever, and the receiving portion communicates with the slot and the adjacent notch.

8. The sliding module as claimed in claim 1, wherein the assist lever includes a connecting end and a driving end integrally formed together, the connecting end is connected to the first section, the hinge module includes a cam, and the driving end is non-rotatably connected to the cam.

9. An electronic device comprising:
a first section;
a second section;
a pivot plate, two sides of the pivot plate respectively rotatably connected to the first section and the second section;
a hinge module positioned on the second section;
an assist lever, two ends of the assist lever respectively rotatably connected to the first section and the hinge module;
wherein the first section brings the assist lever to rotate relative to the hinge module, and elevates the pivot plate, the pivot plate and the assist lever bring the first section to move and rotate relative to the second section in a tilted orientation.

10. The electronic device as claimed in claim 9, wherein the assist lever includes a connecting end and a driving end integrally formed together, the connecting end is connected to the first section, the hinge module includes a cam, and the driving end is non-rotatably connected to the cam.

11. The electronic device as claimed in claim 9, wherein the pivot plate includes a main body, and a pair of first support arms, a pair of second support arms formed at two sides of the main body, the first support arms are rotatably connected to first section, and the second support arms are rotatably connected to the second section.

12. The electronic device as claimed in claim 11, wherein each first support arm includes a first hinged end, the first hinged ends are coaxially arranged to be connected to the first section, each second support includes a second hinged end, the second hinged ends are coaxially arranged to be connected to the second section.

13. The electronic device as claimed in claim 9, wherein a receiving portion is formed on the second section, a fixing cover is mounted to the receiving portion, and the hinge module is positioned between the fixing cover and the receiving portion.

14. The electronic device as claimed in claim 13, wherein the receiving portion defines a first arcuate groove, and the fixing cover defines a second arcuate groove, the first arcuate groove and the second arcuate groove together define a hinge space to non-rotatably connect the hinge module.

15. The electronic device as claimed in claim 13, wherein the second section defines two notches at opposite side of a surface thereof for connecting the other side of the pivot plate, a slot is defined in the surface of the second section adjacent to one of the notches, the slot connects one end of the assist lever, and the receiving portion communicates with the slot and the adjacent notch.

\* \* \* \* \*